Nov. 11, 1952  B. O. PRENTICE  2,617,312
MECHANICAL MOVEMENT
Filed Nov. 1, 1949  3 Sheets-Sheet 1
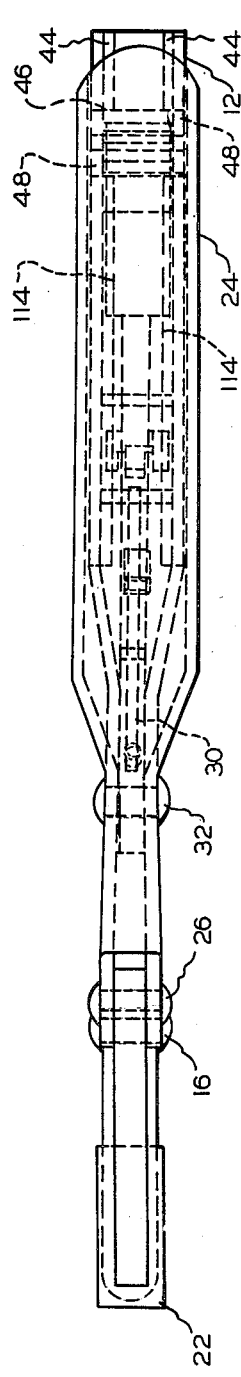
FIG. II.
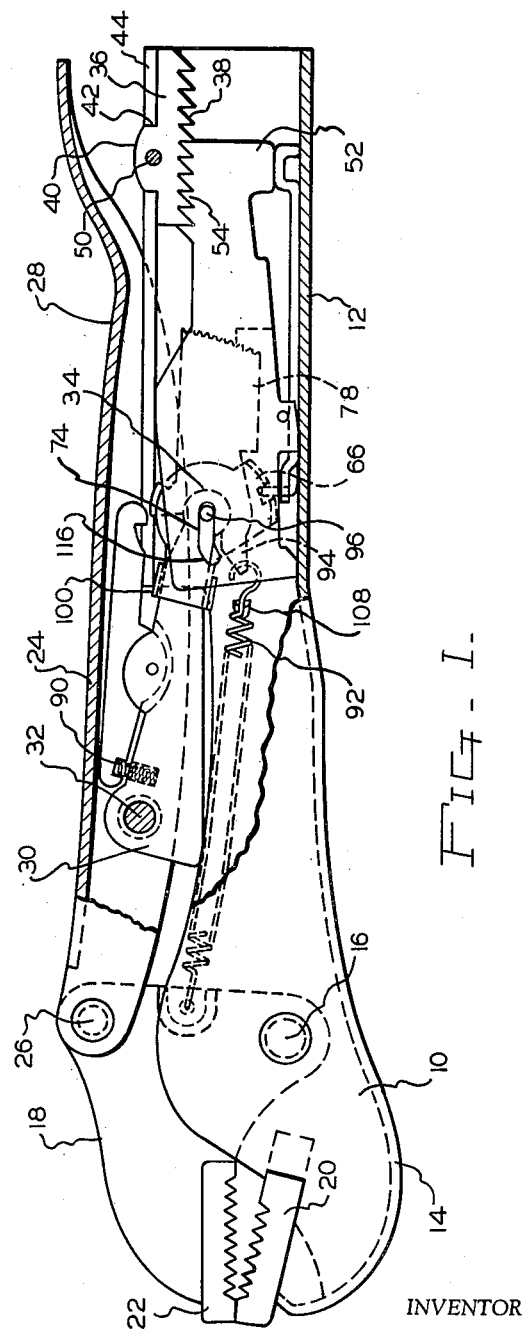
FIG. I.
INVENTOR
BEARL O. PRENTICE
BY Beaman & Patch
ATTORNEYS Nov. 11, 1952     B. O. PRENTICE     2,617,312
MECHANICAL MOVEMENT
Filed Nov. 1, 1949     3 Sheets-Sheet 2
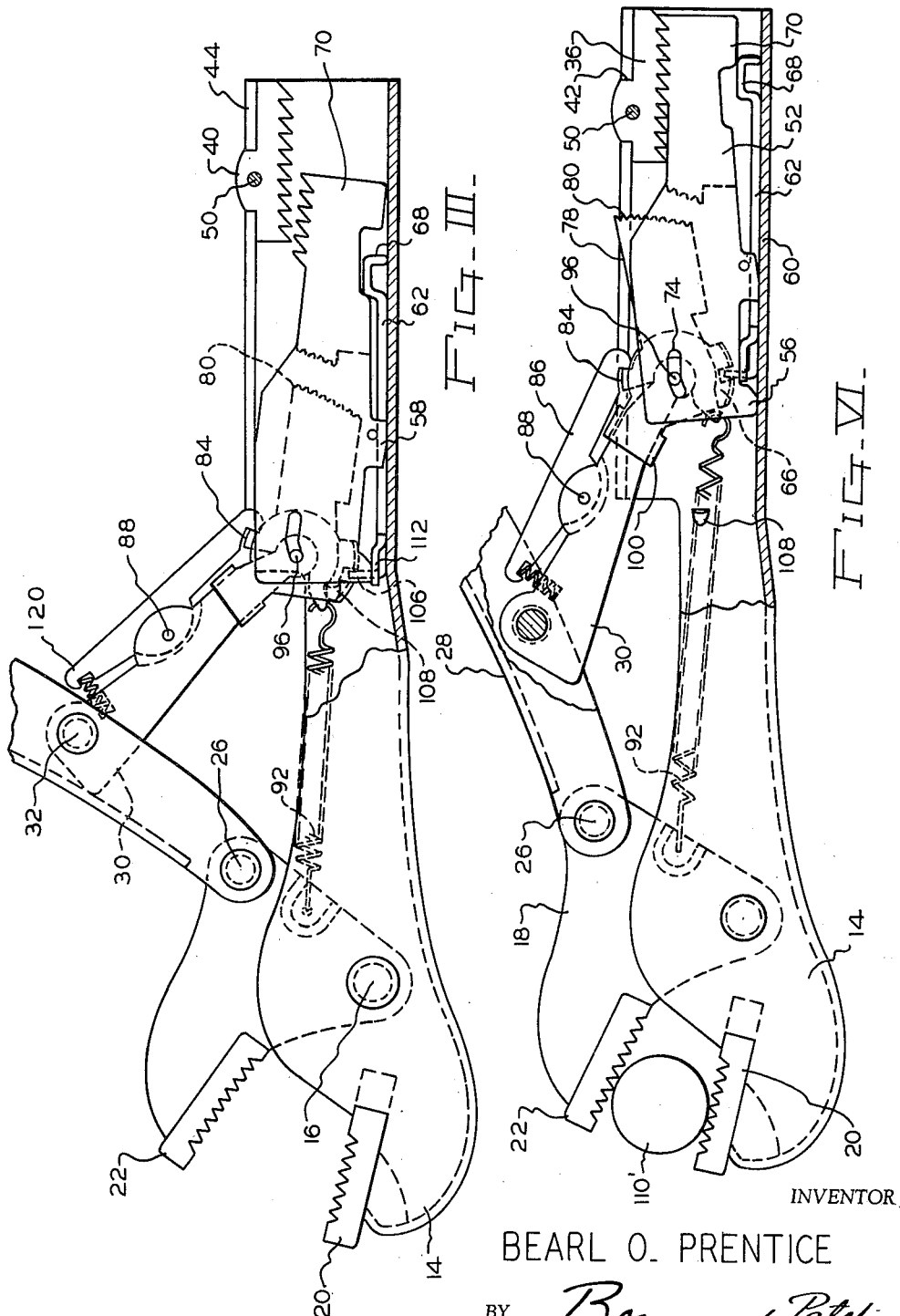
INVENTOR
BEARL O. PRENTICE
BY Beaman & Patch
ATTORNEYS

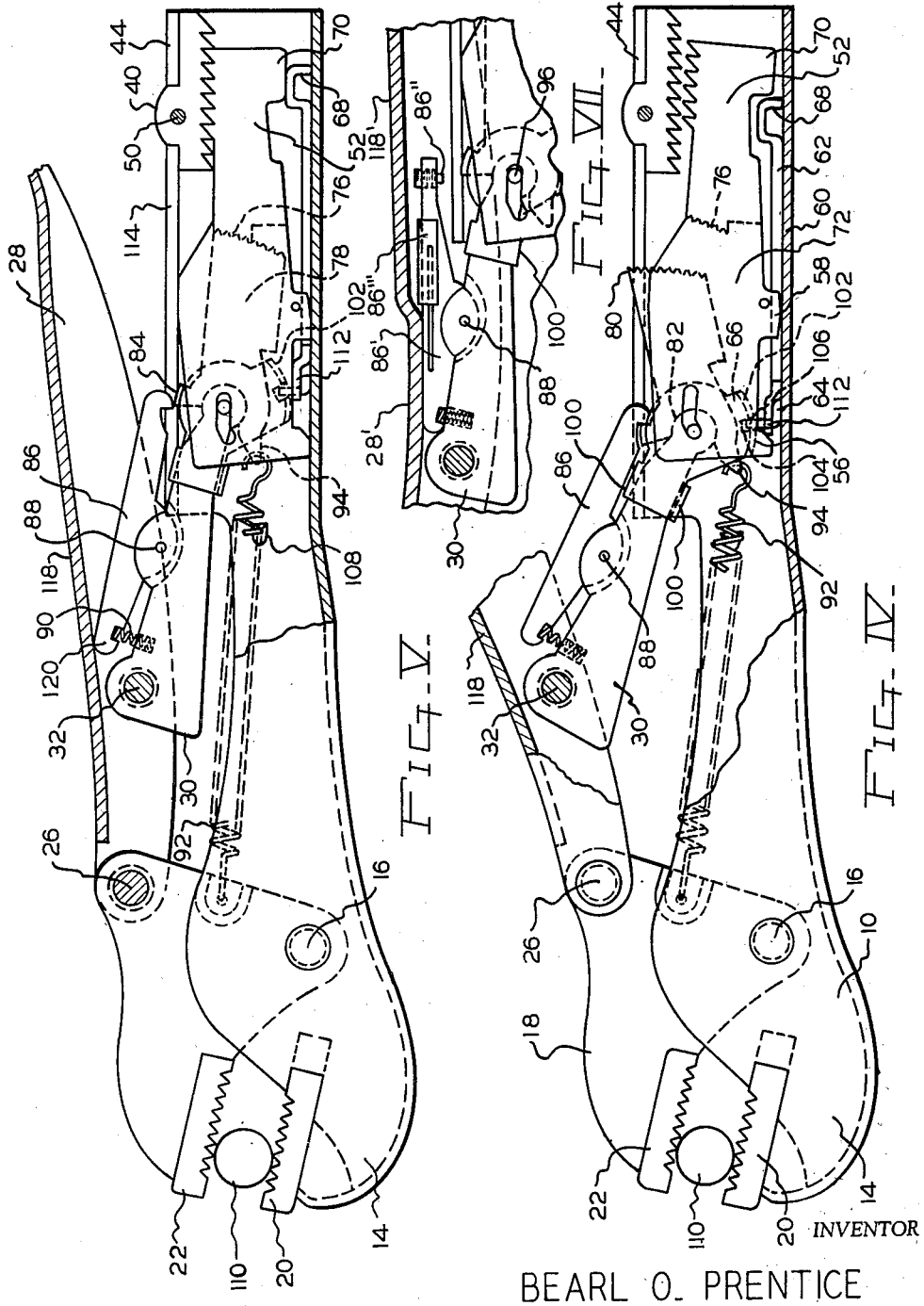

Patented Nov. 11, 1952

2,617,312

UNITED STATES PATENT OFFICE 2,617,312

MECHANICAL MOVEMENT

Bearl O. Prentice, Jackson, Mich.

Application November 1, 1949, Serial No. 124,784

5 Claims. (Cl. 74—520)

The present invention relates to improvements in mechanical movements adapted to holding, turning, clamping, cutting, forming and other force applying or resisting mechanism.

More specifically, the principles herein disclosed find particular use in clamps, vises, wrenches, pliers, work-holders, fixtures, jigs, chucks, shears, cutters and similar tools and devices, as well as in the broader field of push and pull mechanisms.

When mechanism is provided to position one member relative to another to clamp, hold, twist, turn, cut or form the parts between the members, if relative rigidity is to be maintained with adjustability to parts of various sizes provided, a screw is usually employed in mechanical linkage with wedges, cams and eccentrics less frequently used. In combination with the screw or equivalent means is frequently employed toggle joints, levers of various classes, and cams to provide quicker acting mechanism, while maintaining the adjustability and rigidity of the screw.

As an example of the prior art as applied to wrenches and pliers, reference may be had to the Peterson Patents Nos. 1,489,458 and 2,481,866, wherein adjustability to parts of different sizes is obtained by manual adjustment of a screw abutment which locates the position of the toggle joint fulcrum.

The Merriman Patent No. 2,439,483 is another example of the prior art in which the necessity for adjustment to various sizes of parts has been provided by a manually adjustable screw.

It is an object of the present invention to provide mechanical movements which may be readily adapted by those skilled in the art into devices and mechanisms outlined in the opening paragraph of this specification to provide automatic sizing and adjustment to the part or subject upon which the device or mechanism is to operate.

Another object of the invention is to provide mechanical movements for automatically locating the fulcrum of a toggle joint or its equivalent as a preliminary sizing or adjustment operation.

Another object of the invention is to provide, in combination with a mechanical advantage mechanism of fixed stroke, an automatically sizing abutment whereby substantially equal force or resistance may be applied under varying conditions of sizes, shapes, clearances, degrees of wear and the like of the part or the device which may be the subject of the mechanical advantage mechanism.

A further object of the invention is to provide a force applying mechanism embodying a toggle joint wherein an initial resistance functions to automatically position the point of fulcrumage.

A still further object of the invention is to provide an abutment for such members as the jaws of wrenches, pliers, vises and the like in which the position of adjustment with positive support, may be practically provided in intervals of a few thousands of an inch.

A still further object of the invention is to provide, in combination with a toggle joint, a fulcrum which is automatically positioned with respect to the size of the part or object against which the toggle is being employed to exert a force or a resistance characterized by the positioning of the fulcrum at a point whereby the toggle joint functions in its range of maximum mechanical advantage.

Other objects and advantages residing in the combination, arrangement and construction of parts, will more fully appear from a consideration of the following specification and the appended claims.

In the drawings,

Fig. I is a side elevational view of a wrench or pliers embodying the present invention and partly shown in broken cross-section, Fig. II is a top view of Fig. I, Fig. III is a view of the construction shown in Fig. I, but with the jaws in the fully opened position, Fig. IV is a view similar to Fig. I showing the jaws clamped upon a small object with the automatic fulcrum positioning mechanism in its initial position, Fig. V is a view similar to Fig. IV showing the position of the automatic fulcrum mechanism in its fully applied position, Fig. VI is a view similar to Fig. IV showing a part of larger size being clamped between the jaws and the automatic fulcrum positioning mechanism in its intermediate state of operation, and Fig. VII shows a modified form of the invention for adjusting the stroke of the toggle joint and the amount of progressive sizing.

It is to be understood that the construction shown in the drawing, in which the principles of the present invention have been applied to a wrench plier type of tool solely for illustration purposes. It does represent, however, one form of the invention upon which an actual reduction to practice has been accomplished. Other and more simplified construction embodying the principles are anticipated and under construction and will form the basis of continuing applications for Letters Patent.

Referring to Fig. I in which the position of the parts are shown with the jaws closed upon themselves, or a very thin object, the sheet metal body 10 of the tool is of channel shape to provide a fixed handle portion 12 and a fixed jaw supporting portion 14. Hinged on a rivet 16 is a movable jaw supporting member 18. Inserted jaws 20 and 22 are carried in the parts 14 and 18 respectively.

Toggle linkage for actuating the jaw 22 relative to the jaw 20 comprises a movable handle 24 having a hinged connection at one end with the member 18 through the rivet 26 with the other end 28 disposed along the handle part 12. As shown, the handle 24 is sheet metal channel like construction. The other link of the toggle takes the form of a member 30, of substantial thickness having a hinged connection at one end with the handle 24 through the rivet 32. At the other end, the member 30 has a semi-cylinder portion 34 which hinges in the automatically adjustable fulcrum mechanism.

The automatically adjustable fulcrum mechanism comprising an abutment rack 36 having teeth 38 on the one side and a projection 40 on the other which presents a shoulder 42 to the turned in flanges 44. An opening 46 in the channel of the handle 12 is provided for the projection 40 by turning up ears 48 from the flanges 44. A pin 50 inserted through aligned holes in the projection 40 and ears 48 hold the rack 36 in position.

Co-acting with the rack 36 is an abutment pawl 52 having teeth 54 adapted to selectively engage the teeth 38 at different points along the rack 36 depending upon the size of the object being clamped between the jaws 20 and 22. Along one edge of the pawl 52 is defined an ear 56 and a channel shaped fulcrum 58 each of which engage with the web 60 of the handle 12.

Disposed between the pawl 52 and web 60 is a locking bar 62 axially slideable relative to the pawl 52. At one end of the bar 62 an out turned end 64 is provided to engage with and be actuated by the shifter plate 66 while at the other end a cam portion 68 is adapted to engage with the portion 70 of the pawl 52 to back up the engagement between the teeth 38 and 54. In the illustration, the bar 62 is narrower than the pawl 52 and slides in the channel fulcrum 58.

The end of the pawl 52 removed from the teeth 54 is shown of forked construction defined by spaced portions 72 having transversely aligned slots 74. At the base of the forked construction is a sizing rack portion 76.

Supported in the fork of the pawl 52 for both axial and rotational movement is a sizing pawl 78. At one end of the pawl 78 is a multi-toothed pawl portion 80 adapted to selectively engage upon axial and pivotal movement with the rack portion 76. The other end of the pawl 78 has a socket portion 82 which in reality is the fulcrum of the toggle joint in that it provides the abutment bearing for the semi-cylinder end 34 of the link member 30.

For controlling the movement of the sizing pawl 78 a catch 84 on the pawl 78 is engaged by a latch 86 hinged on a pin 88 carried on the member 30. A spring 90 urges the latch 86 toward the catch 84. Tending to rotate the pawl 78 around the cylindrical end 34 of the member 30 and away from the latch 86 is a spring 92 connected between the jaw supporting member 18 and a point of connection 94 on the pawl 78.

Operating in the slots 74 is a pin 96 carried in the end 34 of the member 30. The pin 96 has a free sliding fit in the slots 74 to enable it to follow the angular shape of the slots which enable the pawl 52 to have limited movement about the fulcrum 58.

The control for the locking bar 62 may conveniently take the form of a thin metal plate 66 crimped on the member 30 by flanges 100 and located on the pin 96. An arcuate edge portion 102 has a turned flange with a slot 104 to receive the turned out projection 106 on the bar 62. It will be understood that as the angularity of the member 30 changes the bar 62 will shift relative to the pawl 52.

When the handle 28 is swung into its wide open position as shown in Fig. III, the tension of the spring 92 swings the jaw supporting member 18 into its wide open position and the pawl 52 has been positioned by the stop 108. This tension holds the pawl 52 against the stop 108 upon clockwise movement of the handle 28, as viewed in Fig. IV, while the member 18 is rotated about the pivot 16 until movement of the jaw 22 toward the jaw 20 is resisted by some object 110. This interrupts the arcuate movement of the pivot 26 with continued movement of the handle 28 tending to straighten out the toggle. At this point the latch 82 is engaging the catch 84 and the cam portion 112 located at one side of the projection 106 is between the stop 56 on the pawl 52, and the web 60. As the pawl 52 is guided between the web 60 and the turned in flanges 114 of the handle portion 12, the location of the pin 96 in the angular portion 116 of the slot 74 will result in the pawls 52 and 78 and lock bar 62 all moving as a unit toward the right as viewed in Fig. IV.

As movement from the position of the pawl 52 in Fig. IV to the position of Fig. V takes place, the change in angular position of the member 30 results in the plate 66 shifting the bar 62 sufficiently to the right to withdraw the cam portion 112 from beneath the ear 56 to enable the pawl 52 to rock about the fulcrum 58 bringing the teeth 54 into engagement with the teeth 38 of the rack 36. As the movement of the bar 62 is continued the portion 68 will be disposed between the portion 70 of the pawl 52 and the web 60 to hold the pawl 52 in backed up engagement with the rack 36.

Following the primary automatic location of the fulcrum mechanism for the member 30 just described, continued movement of the handle 28 toward its closed position will bring the web 118 of the handle 28 into engagement with the end 120 of the latch 86 to disengage the catch 84. Prior to such disengagement, the rocking of the pawl 52 about its fulcrum 58 to engage the rack 36 as so aligned the slot 74 and pin 96 as to enable relative movement of the pawl 78 to take place between the forked end of the pawl 52. When the latch 86 disengages the catch 84, the pawl 78 is urged clockwise by the spring 92 into the position shown in Fig. V with the toothed portion 80 engaging the rack portion 76. The action of the pawl 78 fills in the space between that portion of the pawl 52 engaging the rack 36 and the cylindrical fulcrum end of the member 30 supported, in the fulcrum socket 82. Preferably, the portion 80 has a pitch over the length of its surface approximately the distance between the teeth 38 of the rack 36.

It is to be understood that the primary positioning of the pawl 52 relative to the rack 36 and the secondary positioning of the pawl 78 relative to the rack 76 results in the automatic final location of the fulcrum 82 for the member 30. The toggle joint is now established at a point close approaching the extended portion of the toggle to take advantage of the full power of the toggle action as delivered from the handle 28 to the jaws 20 and 22. The parts are shown in that position in Fig. V. Prior to movement of the handle 28 into position of Fig. I in which the pivot 32 has been moved slightly across the center of the toggle joint as to be self locking.

In Fig. VI the manner in which the present invention adapts itself to a lower part 110' is shown. It will be noted that the pawl 52 has assumed a position further to the right as compared to Fig. V. The bar 62 is shown in an intermediate position with respect to the showing in Figs. IV and V.

To understand the principle of operation of the construction above described, the pawl 78 may be considered in the nature of a wedge which is rocked into position by the spring 92 upon being released by the latch 86. From this point of view the engaging surfaces of the portion 76 and 80 need not be toothed or otherwise roughened but may be relatively smooth. However, a toothed surface is preferred as it produces an audible indication of the sizing operation upon slight oscillation of the handle 28 which results in the fulcrum 82 being moved slightly to the left with the spring 92 ratching the tooth portion 80 over the rack 76 to fill in the space resulting from movement of the fulcrum 82 to the left.

If it is assumed the teeth 38 are provided eight to the inch, the positions the pawl 52 may assume are at least .125" apart. If the pitch of the toothed portion 80 over its arcuate surface is taken at .128" and sixteen teeth are provided, the advancement of a tooth on the portion 80 over a tooth on the complementary rack 76 will result in the fulcrum 82 being moved to the left approximately .008". After the handle portion 28 has been moved to its innermost position to extend the toggle and exert the force upon the jaw 22, if the handle portion 28 is slightly raised or rotated counter-clockwise to move the fulcrum 82 to the left approximately .008", the spring 92 will ratchet the portion 80 over the rack 76 one tooth which produces an audible "click." The greater the distance the fulcrum 82 is moved to the left by slightly lifting the handle portion 28, the greater will be the clockwise ratching movement of the portion 80 over the rack 76 within the limits of the .128" pitch in the case of the above example.

By exerting a "pumping" action upon the handle portion 28, of very slight amplitude, the jaw 22 may be advanced toward the jaw 20 with a step by step movement applied with the full force of the toggle joint working with a range of movement directly adjacent the extended plane of the joint. This characteristic of the invention following the initial automatic sizing or location of the fulcrum 82 well adapts the invention for use as cutters and shears, as for example, shear blades may be conveniently substituted for the jaws 20 and 22 to provide a heavy duty wire or bolt cutter.

Where it is desired to reduce the angularity between the hinge points of the toggle joint after the location of the fulcrum 82 has been automatically established, this may be done by changing the point at which the latch 86 is actuated to release the pawl 78 to complete the automatic location of the fulcrum 82. One manner in which this may be accomplished is shown in Fig. VII in which the latch 86' is equipped with an adjustable length projection 86" which engages with the catch 84'. The projection 86" may take the form of a screw which may be threaded in and out to vary the point of release of the catch 84'.

Where it is desired to adjust the handle 28 from an over center final position to a self-opening position, the stop character of the central portion of the latch 86 through engagement with the web 118 may be conveniently altered. As shown in Fig. VII, the web 118' of the handle portion 28' is slightly recessed to one side of the stop position to provide clearance for an auxiliary stop member 86''' which straddles the latch 86 with a sliding grip to enable it to be manually shifted on the member 86' to engage the web 118', to the left of the recessed portion of the handle 28' to stop the action of the toggle short of the over center position.

I claim:

1. A mechanical movement structure for toggle joint mechanism for automatically locating a fulcrum of the joint to vary the point of extended position of the toggle to accommodate the joint to various conditions of operation comprising a pair of links connected by a pivot, an end of one of said links removed from said pivot being a force-delivering end, an end of said other of said links removed from said pivot being the fulcrum end of the joint, a fixed abutment, a movable abutment mechanism having a fulcrum portion for the toggle to which the fulcrum end of said other link is connected, means supporting said mechanism for longitudinal movement relative to said fixed abutment, means connected to said mechanism to resist longitudinal movement of said mechanism upon initial pivotal movement of said links in a toggle extending direction, yet capable of being overcome by an increase in resistance to movement of said force-delivering end of said first link, interlocking parts upon said fixed abutment and said mechanism, and mechanism adapted to be actuated upon predetermined movement of said toggle joint to bring said parts into interlocking position to form said abutment into a rigid composite abutment structure for said fulcrum.

2. A mechanical movement structure as defined in claim 1 wherein said movable abutment mechanism comprises a pair of relatively movable members one of which interlocks with said fixed abutment, the other of said member includes said fulcrum portion and is supported for engagement with said first member upon relative transverse movement along wedging surfaces.

3. A mechanical movement structure as defined in claim 1 wherein said movable abutment mechanism comprises a pair of relatively movable members, one of which interlocks with said fixed abutment, the other of said members includes said fulcrum portion and is supported for engagement with said first member upon relative transverse movement along wedging surfaces, and spring means continuously acting to increase the wedging action along said surfaces to extend said movable members to change the position of said fulcrum portion.

4. A mechanical movement structure as defined in claim 1 wherein said movable abutment mechanism comprises a pair of relatively movable members, one of which interlocks with said fixed abutment, the other of said members includes said fulcrum portion and is supported for engagement with said first member upon relative transverse movement along wedging surfaces, spring means continuously acting to increase the wedging action along said surfaces to extend said movable members to change the position of said fulcrum portion, and means for moving said fulcrum portion in a direction to permit said spring means to increase the wedging action between said members.

5. A mechanical movement structure for toggle joint mechanism as defined in claim 1 wherein said movable abutment mechanism comprising a pair of relatively movable members, one of which interlocks with said fixed abutment, the other of said members includes said fulcrum portion and is supported for engagement with said first member with relative transverse movement along wedging surfaces, spring means continuously acting to increase the wedging action along said surfaces to extend said relatively movable members to change the position of said fulcrum portion, means for moving said fulcrum portion in a direction to permit said spring means to increase the wedging action between said members, said last means including an operating part of the toggle joint.

BEARL O. PRENTICE.

REFERENCES CITED

The following references are of record in the file of this patent:

UNITED STATES PATENTS

| Number | Name | Date |
|---|---|---|
| 416,500 | Robbins | Dec. 3, 1889 |
| 1,445,280 | Jordan | Feb. 13, 1923 |
| 1,531,688 | Bush | Mar. 31, 1925 |
| 1,820,169 | Wigand | Aug. 25, 1931 |
| 2,558,958 | Jandus et al. | July 3, 1951 |